Dec. 5, 1933.  J. C. JARRETT  1,937,821
FRONT DRIVE AXLE
Filed Nov. 13, 1931  3 Sheets-Sheet 1

INVENTOR
JAMES C. JARRETT
BY Fred E. Mefford
ATTORNEY

Patented Dec. 5, 1933

1,937,821

UNITED STATES PATENT OFFICE 1,937,821

FRONT DRIVE AXLE

James C. Jarrett, Colorado Springs, Colo.

Application November 13, 1931
Serial No. 574,780

4 Claims. (Cl. 180—43)

My invention relates to motor vehicles and my object is to provide a front drive axle for said vehicles.

Figure 1:
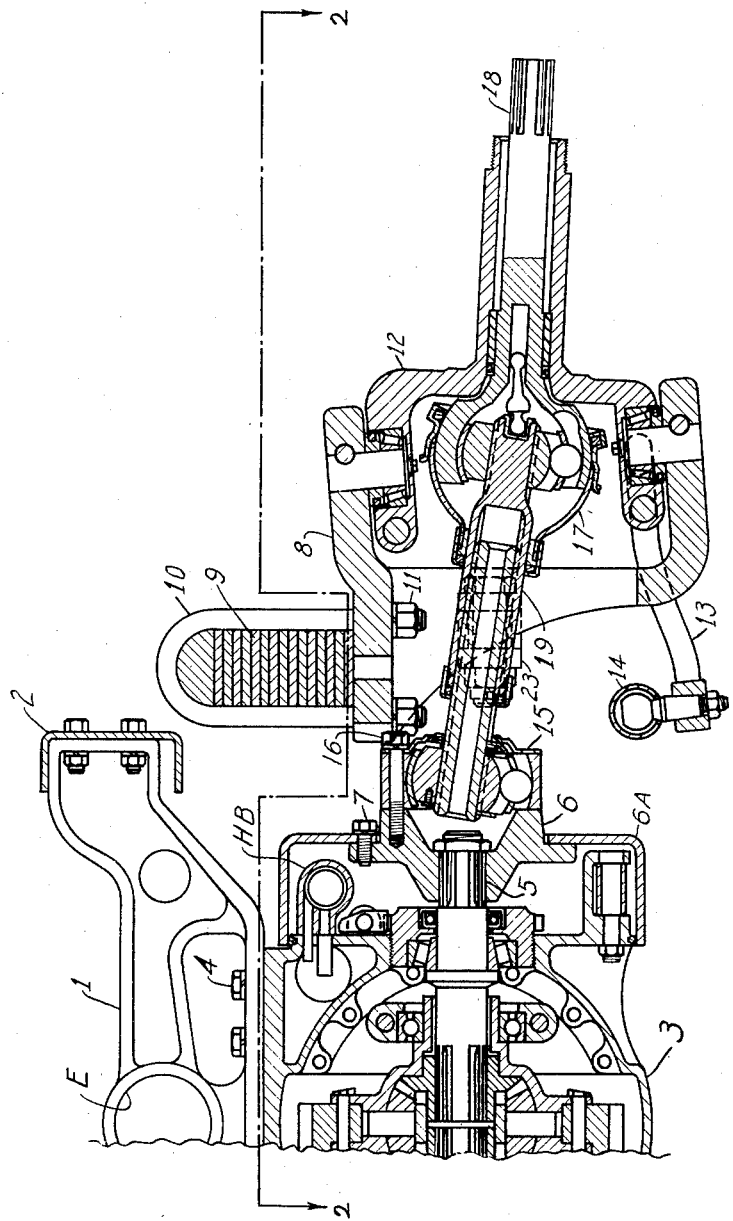
Figure 2:
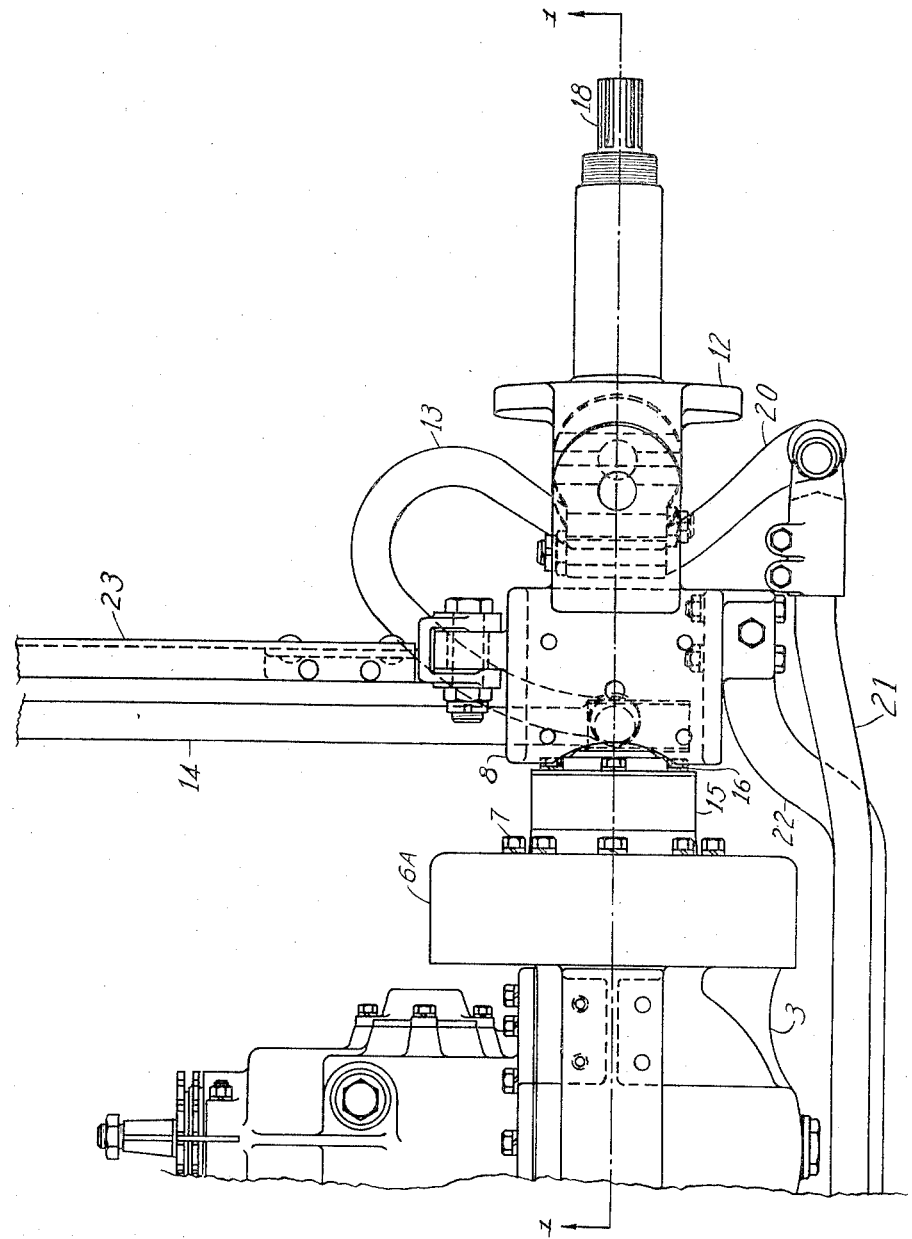
Figure 3:
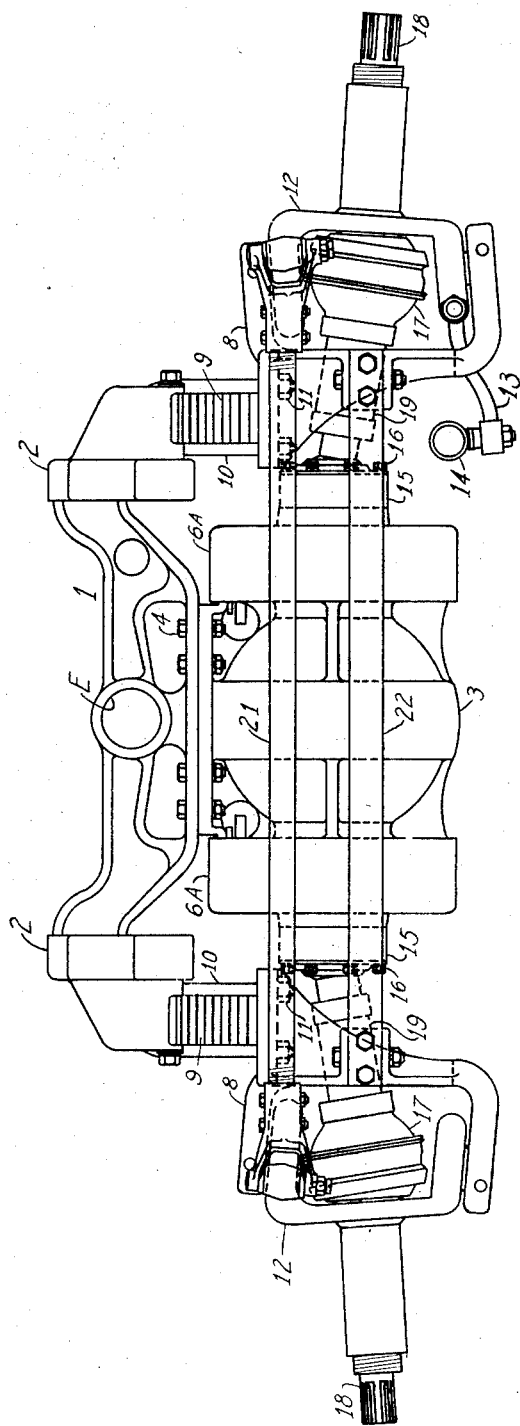

Figure 1 represents a cross sectional elevation on the line 1—1 in Fig. 2; Fig. 2, a plan view on the line 2—2 in Figure 1; and Fig. 3, a front elevation.

Although I show the preferred embodiment of my invention, I do not thereby limit myself to the precise form shown but wish it understood that within the scope of what is hereinafter claimed, various changes in the precise details of construction, may be made without departing from the spirit of the invention.

In this device a differential housing and engine trunnion 1 is mounted in the frame 2 of a motor vehicle and contains a bearing E which is adapted to receive and hold the engine support. A differential housing 3 is bolted to trunnion 1 by bolts 4 and contains differential gearing including a differential axle shaft 5. A brake hub 6 is mounted on shaft 5 and carries a brake drum 6A bolted thereto by bolts 7. A spring seat yoke 8 is secured to a spring 9 by spring clip 10 and nuts 11. A steering knuckle 12 is mounted in yoke 8. A steering arm 13 is secured to steering knuckle 12 and a drag link 14 is connected to steering arm 13 and adapted to be connected to the steering mechanism of the vehicle. An inner universal joint 15 is secured to brake hub 6 by bolts 16 and an outer universal joint 17 is connected to a wheel axle 18 which is journalled in spring seat yoke 8. These two universal joints are connected by a splined slip joint 19. The universal joints shown in the drawings are known in the trade as the Rzeppa universal joints of the constant velocity type, therefore a detailed description is deemed unnecessary.

The assembly shown in the drawings is for the left hand side of the vehicle and a similar assembly is used for the right hand side, except the steering arm and drag link.

A cross steering arm 20 is secured to steering knuckle 12 to which one end of a cross rod 21 is connected. The opposite end of cross rod 21 is connected to a similar cross steering arm on a steering knuckle on the opposite side of said vehicle. One end of a dead axle 22 is connected to spring seat yoke 8 and the opposite end to a similar spring seat yoke on the opposite side of said vehicle. A radius rod 23 is connected to spring seat yoke 8 and to a casting 24 secured to frame 2.

In the drawings I have shown a hydraulic brake HB but I contemplate the use of other types of brakes as well.

The differential assembly housing together with the brakes, which can be either hydraulic, air, electric or mechanical, are mounted on either side of the differential housing. The final drive is double reduction. I use four universal joints in the construction of this axle, one on either side of the differential housing and the other two at the wheels. By the application of these joints to my steering knuckles I am able to steer the wheels in either direction up to 40 degrees, with great ease.

Having thus described my invention what I claim as new and desire to secure by Letters Patent is:

1. In a front drive axle, the combination of an engine and differential housing trunnion, adapted to be mounted in the frame of a motor vehicle and containing a bearing adapted to receive and hold the engine support; a differential housing secured to the bottom of said trunnion; a differential, having a differential axle shaft, mounted within said housing; a brake hub mounted on said differential axle shaft; a spring seat yoke adapted to be secured to a spring of said vehicle; a steering knuckle mounted in said yoke; a universal joint secured to said brake hub; a wheel axle journalled in said steering knuckle; a universal joint connected to said wheel axle; a splined slip joint connecting said universal joints.

2. In a front drive axle, the combination of an engine and differential housing trunnion, adapted to be mounted in the frame of a motor vehicle and containing a bearing adapted to receive and hold the engine support; a differential housing secured to the bottom of said trunnion; a differential, having a differential axle shaft, mounted within said housing; a brake hub mounted on said differential axle shaft; a spring seat yoke adapted to be secured to a spring of said vehicle; a steering knuckle mounted in said yoke; a universal joint secured to said brake hub; a wheel axle journalled in said steering knuckle; a universal joint connected to said wheel axle; a splined slip joint connecting said universal joints; a steering arm connected to said steering knuckle; a drag link connected to said steering arm and adapted to be connected to the steering mechanism of said vehicle.

3. In a front drive axle, the combination of an engine and differential housing trunnion, adapted to be mounted in the frame of a motor vehicle and containing a bearing adapted to receive and hold the engine support; a differential housing secured to the bottom of said trunnion; a differential, having a differential axle shaft, mounted within said housing; a brake hub mounted on said differential axle shaft; a brake drum mounted on said brake hub; a spring seat yoke adapted to be secured to a spring of said vehicle; a steering knuckle mounted in said yoke; a universal joint secured to said brake hub; a wheel axle journalled in said steering knuckle; a universal joint connected to said wheel axle; a splined slip joint connecting said universal joints.

4. In a front drive axle, the combination of an engine and differential housing trunnion, adapted to be mounted in the frame of a motor vehicle and containing a bearing adapted to receive and hold the engine support; a differential housing secured to the bottom of said trunnion; a differential, having a differential axle shaft, mounted within said housing; a brake hub mounted on said differential axle shaft; a brake drum mounted on said brake hub; a spring seat yoke adapted to be secured to a spring of said vehicle; a steering knuckle mounted in said yoke; a universal joint secured to said brake hub; a wheel axle journalled in said steering knuckle; a universal joint connected to said wheel axle; a splined slip joint connecting said universal joints; a steering arm connected to said steering knuckle; a drag link connected to said steering arm and adapted to be connected to the steering mechanism of said vehicle.

JAMES C. JARRETT.